US009361169B2

(12) United States Patent
Berkley (10) Patent No.: US 9,361,169 B2
(45) Date of Patent: Jun. 7, 2016

(54) SYSTEMS AND METHODS FOR ERROR CORRECTION IN QUANTUM COMPUTATION (71) Applicant: D-Wave Systems Inc., Burnaby (CA)

(72) Inventor: Andrew J. Berkley, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 81 days.

(21) Appl. No.: 14/173,101

(22) Filed: Feb. 5, 2014

(65) Prior Publication Data
US 2014/0223224 A1 Aug. 7, 2014

Related U.S. Application Data (60) Provisional application No. 61/761,100, filed on Feb. 5, 2013.

(51) Int. Cl.
*G06F 11/00* (2006.01)
*G06F 11/07* (2006.01)
*G06N 99/00* (2010.01)
*G06F 11/14* (2006.01)

(52) U.S. Cl.
CPC ........ *G06F 11/0724* (2013.01); *G06F 11/1492* (2013.01); *G06N 99/002* (2013.01)

(58) Field of Classification Search
CPC ............ G06F 11/0724; G06F 11/1492; G06N 99/002
USPC .......................................................... 714/10
See application file for complete search history.

(56) References Cited

U.S. PATENT DOCUMENTS

| 6,838,694 | B2 | 1/2005 | Esteve et al. |
| 7,135,701 | B2 | 11/2006 | Amin et al. |
| 7,307,275 | B2 | 12/2007 | Lidar et al. |
| 7,335,909 | B2 | 2/2008 | Amin et al. |
| 7,418,283 | B2 | 8/2008 | Amin |
| 7,533,068 | B2 | 5/2009 | Maassen van den Brink et al. |
| 7,858,966 | B2 | 12/2010 | Kitaev |
| 7,876,248 | B2 | 1/2011 | Berkley et al. |
| 7,898,282 | B2 * | 3/2011 | Harris ................... B82Y 10/00 326/3 |
| 7,966,549 | B2 | 6/2011 | Hollenberg et al. |
| 8,008,942 | B2 | 8/2011 | van den Brink et al. |
| 8,035,540 | B2 | 10/2011 | Berkley et al. |

(Continued)

FOREIGN PATENT DOCUMENTS

WO 2012/064974 A2 5/2012

OTHER PUBLICATIONS

Amin, "Effect of Local Minima on Adiabatic Quantum Optimization," arXiv:0709.0528v2 [quant-ph] Apr. 4, 2008, 4 pages.

(Continued)

*Primary Examiner* — Yair Leibovich
(74) *Attorney, Agent, or Firm* — Seed IP Law Group PLLC (57) ABSTRACT

The effects of decoherence and/or noise in adiabatic quantum computation and quantum annealing are reduced by implementing replica coding schemes. Multiple instances of the same problem are mapped to respective subsets of the qubits and coupling devices of a quantum processor. The multiple instances are evolved simultaneously in the presence of coupling between the qubits of different instances. Quantum processor architectures that are adapted to facilitate replica coding are also described.

12 Claims, 4 Drawing Sheets (56) References Cited

U.S. PATENT DOCUMENTS

| | | | |
|---|---|---|---|
| 8,190,548 | B2 | 5/2012 | Choi |
| 8,195,596 | B2 | 6/2012 | Rose et al. |
| 8,234,103 | B2 | 7/2012 | Biamonte et al. |
| 8,421,053 | B2 | 4/2013 | Bunyk et al. |
| 8,510,618 | B1 | 8/2013 | Pesetski et al. |
| 2006/0147154 | A1 | 7/2006 | Thom et al. |
| 2008/0176750 | A1 | 7/2008 | Rose et al. |
| 2011/0054876 | A1* | 3/2011 | Biamonte et al. ............... 703/15 |
| 2012/0265718 | A1 | 10/2012 | Amin et al. |

OTHER PUBLICATIONS

Blatter et al., "Design aspects of superconducting-phase quantum bits," *Physical Review B* 63:174511-1-174511-9, 2001.

Devitt et al., "Quantum Error Correction for Beginners," arXiv:0905.2794v4 [quant-ph], Jun. 21, 2013, 41 pages.

Friedman et al., "Quantum superposition of distinct macroscopic states," *Nature* 406:43-46, Jul. 6, 2000.

Il'ichev et al., "Continuous Monitoring of Rabi Oscillations in a Josephson Flux Qubit," *Physical Review Letters* 1(9):097906-1-097906-4, week ending Aug. 29, 2003.

International Search Report, mailed Jun. 24, 2014, for PCT/US2014/014836, 2 pages.

Jordan et al., "Error Correcting Codes for Adiabatic Quantum Computation," arXiv:quantph/0512170v3, Oct. 10, 2006, 5 pages.

Lidar, D., "Towards Fault Tolerant Adiabatic Quantum Computation," arXiv:0707.0021v3 [quant-ph], May 2, 2008, 4 pages.

Makhlin et al., "Quantum-State Engineering with Josephson-Junction Devices," *Reviews of Modern Physics* 73(2):357-400, Apr. 2001.

Mooij et al., "Josephson Persistent-Current Qubit," *Science* 285:1036-1039, Aug. 13, 1999.

Orlando et al., "Superconducting Persistent-Current Qubit," *Physical Review B* 60(22):15 398-15 413, Dec. 1, 1999.

Pudenz et al., "Error Corrected Quantum Annealing with Hundreds of Qubits," arXiv:1307.8190v1 [quant-ph], Jul. 31, 2013, 18 pages.

Sarovar et al., "Error Suppression and Error Correction in Adiabatic Quantum Computation: Non-Equilibrium Dynamics," *New Journal of Physics 15,* 2013, 36 pages.

Written Opinion, mailed Jun. 24, 2014, for PCT/US2014/014836, 10 pages.

Young et al., "Adiabatic Quantum Optimization with the Wrong Hamiltonian," arXiv:1310.0529v1 [quant-ph], Oct. 2, 2013, 8 pages.

Young et al., "Error Suppression and Error Correction in Adiabatic Quantum Computation: Techniques and Challenges," *Physical Review X* 3:041013-1-041013-13, 2013.

\* cited by examiner

SYSTEMS AND METHODS FOR ERROR CORRECTION IN QUANTUM COMPUTATION

BACKGROUND

Field

The present systems and methods generally relate to error correction in quantum computation and particularly relate to error correction in implementations of adiabatic quantum computation and quantum annealing.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems and methods, an "adiabatic" evolution is considered to be an evolution that satisfies the adiabatic condition:

$$\dot{s} |\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in, for example, U.S. Pat. Nos. 7,135,701 and 7,418,283.

Quantum Annealing

Quantum annealing is a computation method that may be used to find a low-energy state, typically preferably the ground state, of a system. Somewhat similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly than classical annealing. It is known that the solution to a hard problem, such as a combinatorial optimization problem, may be encoded in the ground state of a system Hamiltonian (e.g., the Hamiltonian of an (sing spin glass) and therefore quantum annealing may be used to find the solution to such a hard problem. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close to the exact solution. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. Further details and embodiments of exemplary quantum processors that may be used in conjunction with the present systems and methods are described in, for example, U.S. Pat. Nos. 7,533,068, 8,008,942, US Patent Publication 2008-0176750 (now U.S. Pat. No. 8,195,596), US Patent Publication 2009-0121215 (now U.S. Pat. No. 8,190,548), and US Patent Publication 2011-0022820 (now U.S. Pat. No. 8,421,053).

BRIEF SUMMARY

A quantum processor may be summarized as including a first set of qubits and a first set of coupling devices providing communicative coupling between qubits in the first set of qubits; a first set of replica qubits and a first set of replica coupling devices providing communicative coupling between the first set of replica qubits, wherein for each qubit in the first set of qubits a corresponding replica qubit exists in the first set of replica qubits, and for each coupling device in the first set of coupling devices a replica coupling device exists in the first set of replica coupling devices; and a second set of coupling devices, wherein each coupling device in the second set of coupling devices provides communicative coupling between a qubit in the first set of qubits and the corresponding replica qubit in the first set of replica qubits. The quantum processor may include a superconducting quantum processor, the qubits may include superconducting qubits, and the coupling devices may include superconducting coupling devices.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors, drive circuitry and nontransitory computer- or processor-readable media such as nonvolatile memory for instance read only memory (ROM), electronically erasable programmable ROM (EEPROM) or FLASH memory, etc., or volatile memory for instance static or dynamic random access memory (ROM) have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors, including a grid or distributed network of multiple quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide systems and methods for error correction in quantum computation. More specifically, the various embodiments described herein provide systems and methods for implementing error correction protocols in quantum processors designed to perform adiabatic quantum computation and/or quantum annealing algorithms.

As an illustrative example, a superconducting quantum processor designed to perform adiabatic quantum computation and/or quantum annealing is used in the description that follows. However, a person of skill in the art will appreciate that the present systems and methods may be applied to any form of quantum processor hardware (e.g., superconducting, photonic, ion-trap, quantum dot, topological, etc.) implementing any form of quantum algorithm(s) (e.g., adiabatic quantum computation, quantum annealing, gate/circuit-based quantum computing, etc.).

A typical adiabatic evolution may be represented by Equation 1:

$$H_e = (1-s)H_{In} + sH_f \qquad (1)$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). A common approach to adiabatic quantum computation ("AQC"), described, for example, in Amin, M. H. S., "Effect of local minima on quantum adiabatic optimization", *Physical Review Letters*, Vol. 100, 130503 (2008), is to start with an initial Hamiltonian of the form shown in Equation 2:

$$H_{In} = -\frac{1}{2}\sum_{i=1}^{N} \Delta_i \sigma_i^x \quad (2)$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{N} h_i \sigma_i^z + \sum_{i,j=1}^{N} J_{ij}\sigma_i^z\sigma_j^z\right] \quad (3)$$

where N represents the number of qubits, $\sigma_i^z$ is the Pauli z-matrix for the $i^{th}$ qubit, $h_i$ and $J_{i,j}$ are dimensionless local fields for the qubits, and couplings between qubits, and $\varepsilon$ is some characteristic energy scale for $H_f$. Here, the $\sigma_i^z$ and $\sigma_i^z\sigma_j^z$ terms are examples of "diagonal" terms. Throughout this specification, the terms "final Hamiltonian" and "problem Hamiltonian" are used interchangeably. Hamiltonians such as $H_{In}$ and $H_f$ in Equations 2 and 3, respectively, may be physically realized in a variety of different ways. A particular example is realized by an implementation of superconducting qubits.

Figure 1:
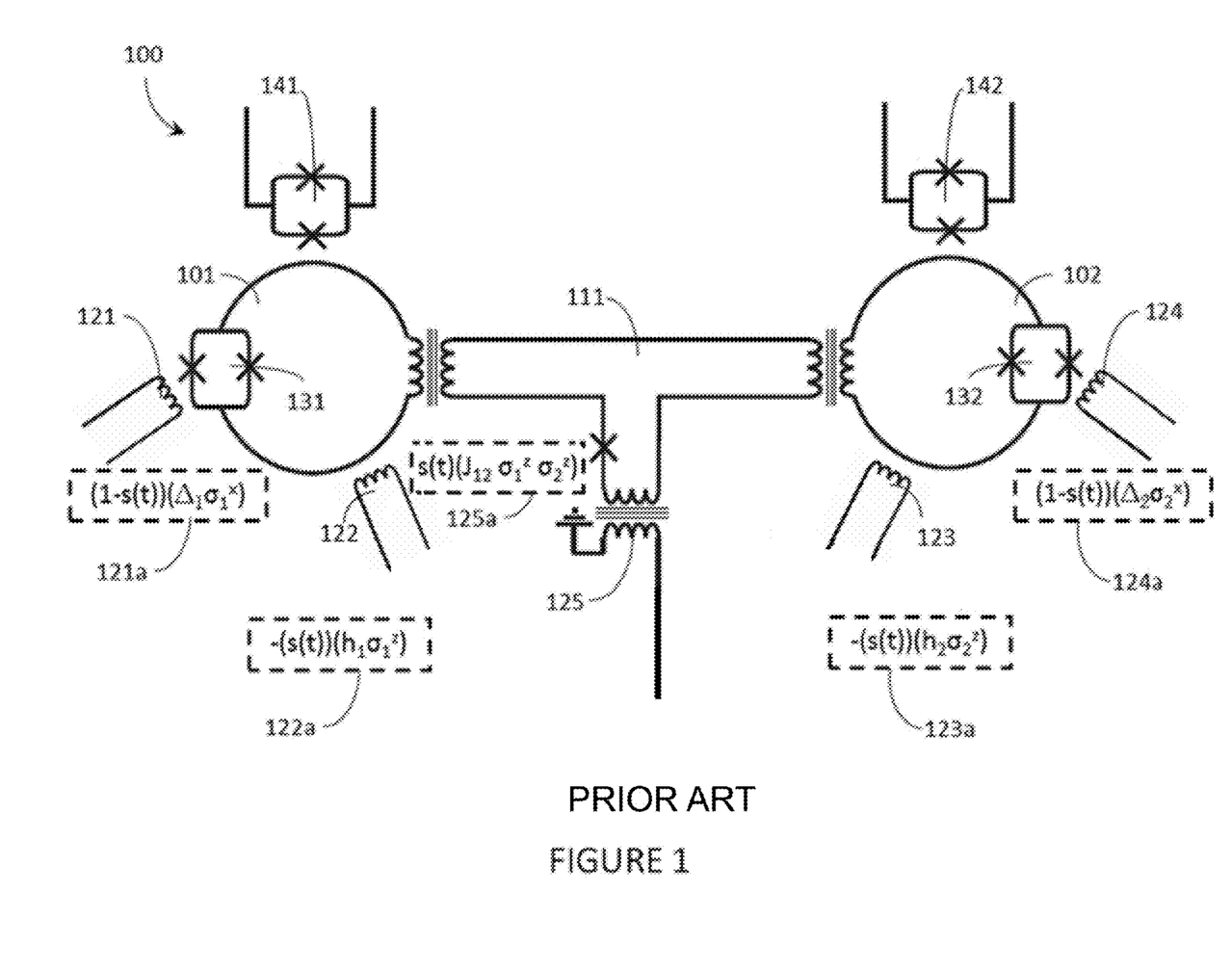
FIG. 1 is a schematic diagram of a portion of an exemplary superconducting quantum processor designed for adiabatic quantum computation (and/or quantum annealing) that may be adapted for use in accordance with the present systems and methods.

FIG. 1 is a schematic diagram of a portion of an exemplary superconducting quantum processor 100 designed for AQC (and/or quantum annealing) that may be adapted for use in accordance with the present systems and methods. The portion of superconducting quantum processor 100 shown in FIG. 1 includes two superconducting qubits 101, 102 and a tunable ZZ-coupler 111 coupling (i.e., a diagonal coupler) information therebetween (i.e., providing pair-wise coupling between qubits 101 and 102). While the portion of quantum processor 100 shown in FIG. 1 includes only two qubits 101, 102 and one coupler 111, those of skill in the art will appreciate that quantum processor 100 may include any number of qubits and any number of coupling devices coupling information therebetween.

The portion of quantum processor 100 shown in FIG. 1 may be implemented to physically realize AQC and/or QA by initializing the system with the Hamiltonian described by Equation 2 and evolving the system to the Hamiltonian described by Equation 3 in accordance with the evolution described by Equation 1. Quantum processor 100 includes a plurality of interfaces 121-125 that are used to configure and control the state of quantum processor 100. Each of interfaces 121-125 may be realized by a respective inductive coupling structure, as illustrated, as part of a programming subsystem and/or an evolution subsystem. Such a programming subsystem and/or evolution subsystem may be separate from quantum processor 100, or it may be included locally (i.e., on-chip with quantum processor 100) as described in, for example, U.S. Pat. Nos. 7,876,248 and 8,035,540.

In the operation of quantum processor 100, interfaces 121 and 124 may each be used to couple a flux signal into a respective compound Josephson junction 131,132 of qubits 101 and 102, thereby realizing the $\Delta_i$ terms in the system Hamiltonian. This coupling provides the off-diagonal $\sigma^x$ terms of the Hamiltonian described by Equation 2 and these flux signals are examples of "disordering signals." Similarly, interfaces 122 and 123 may each be used to couple a flux signal into a respective qubit loop of qubits 101 and 102, thereby realizing the $h_i$ terms in the system Hamiltonian. This coupling provides the diagonal $\sigma^z$ terms of Equation 3. Furthermore, interface 125 may be used to couple a flux signal into coupler 111, thereby realizing the $J_{ij}$ term(s) in the system Hamiltonian. This coupling provides the diagonal $\sigma_i^z\sigma_j^z$ terms of Equation 3. In FIG. 1, the contribution of each of interfaces 121-125 to the system Hamiltonian is indicated in boxes 121a-125a, respectively. Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 121-125.

In the context of quantum processor 100, the term "programming subsystem" is used to generally describe the interfaces (e.g., "programming interfaces" 122, 123, and 125) used to apply the programmable parameters (e.g., the $h_i$ and $J_{ij}$ terms) to the programmable elements of quantum processor 100 and other associated control circuitry and/or instructions. As previously described, the programming interfaces of the programming subsystem may communicate with other subsystems which may be separate from the quantum processor or may be included locally on the processor. Similarly, in the context of quantum processor 100, the term "evolution subsystem" is used to generally describe the interfaces (e.g., "evolution interfaces" 121 and 124) used to evolve the programmable elements of quantum processor 100 and other associated control circuitry and/or instructions. For example, the evolution subsystem may include annealing signal lines and their corresponding interfaces (121, 124) to the qubits (101, 102).

Quantum processor 100 also includes readout devices 141 and 142, where readout device 141 is configured to read out the state of qubit 101 and readout device 142 is configured to read out the state of qubit 102. In the embodiment shown in FIG. 1, each of readout devices 141 and 142 comprises a respective DC-SQUID that is configured to inductively couple to the corresponding qubit (qubits 101 and 102, respectively). In the context of quantum processor 100, the term "readout subsystem" is used to generally describe the readout devices 141, 142 used to read out the final states of the qubits (e.g., qubits 101 and 102) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Application Publication WO 2012-064974.

While FIG. 1 illustrates only two physical qubits 101, 102, one coupler 111, and two readout devices 141, 142, a quantum processor (e.g., processor 100) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

At least some of the devices illustrated in FIG. 1 are simplified in order to enhance clarity. As an example, the structure of the qubits (101, 102) and the interface to the readout devices (141, 142) are simplified in FIG. 1 in order to reduce clutter. While the simplified circuits of quantum processor 100 may be sufficient for some applications, a quantum processor may employ qubit circuits and/or readout schemes that are considerably more complicated than those which are illustrated in FIG. 1.

Adiabatic quantum computing algorithms and quantum annealing algorithms are generally understood in the art to enjoy some robustness against the effects of decoherence and noise, at least when compared to gate/circuit model quantum computing algorithms. However, decoherence and noise effects may still influence the operation of a quantum processor implementing adiabatic/annealing algorithms. For example, decoherence and noise effects may cause the actual parameters realized in the problem Hamiltonian (i.e., Equation 3) to diverge from the parameters intended to be programmed via programming interfaces 121-125 such that the quantum processor may ultimately "solve" a problem that is different from the target problem that the quantum processor was programmed to solve. The present systems and methods provide schemes for correcting such unwanted errors.

Some error-correcting codes for adiabatic quantum computation (e.g., Jordan et al., "Error-correcting codes for adiabatic quantum computation," *Physical Review A*, 74 052322 (2006)) have been proposed in the art, but these proposals typically require higher-order interactions between qubits and multiple X, Y, and Z interactions between qubits (e.g., 4-local and 6-local X, Y, and Z Hamiltonians as opposed to the 2-local Z Hamiltonian of Equation 3 that is realizable by the pair-wise ZZ-coupling in processor 100) and/or high bandwidth control to enable precise gate application. The present systems and methods provide error correction schemes that may be implemented using low bandwidth control and easier-to-implement 2-local Z Hamiltonians such as Equation 3.

In accordance with the present systems and methods, a quantum processor designed to perform adiabatic and/or annealing algorithms (e.g., processor 100 from FIG. 1) may be adapted to implement a replica coding scheme in order to reduce the effects of decoherence and noise. As an example, the problem Hamiltonian (e.g., Equation 3) may be adapted to use linearly more qubits to achieve an exponential decrease in the effects of decoherence and noise. The problem Hamiltonian may be adapted, for example, by encoding multiple identical instances (or "replicas") of the problem within the quantum processor architecture.

Figure 2:
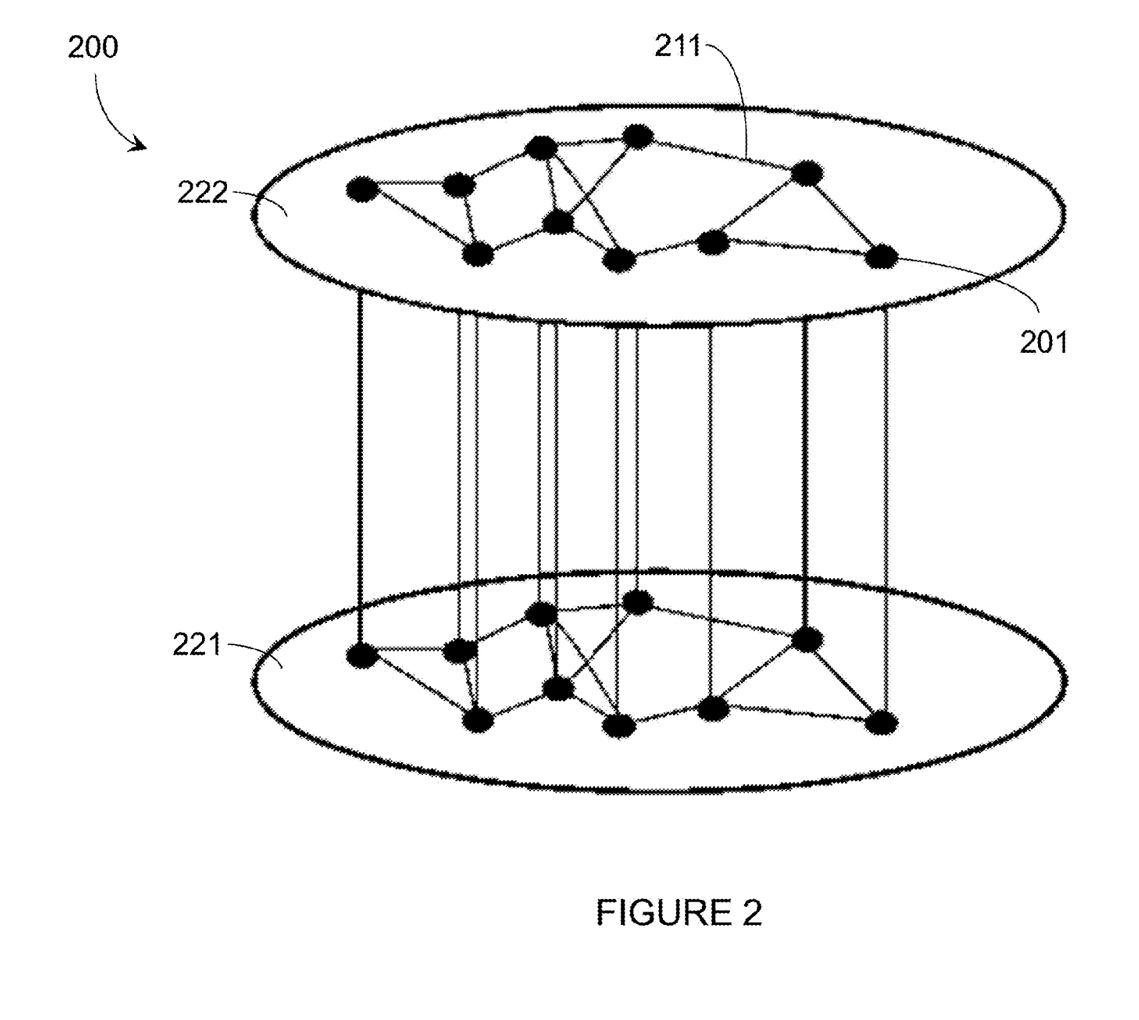
FIG. 2 is an illustrative diagram showing an exemplary plurality of instances of replica coding in accordance with the present systems and methods.

FIG. 2 is an illustrative diagram showing an exemplary plurality of instances 200 of replica coding in accordance with the present systems and methods. In FIG. 2, nodes 201 represent qubits (only one called out in the Figure to reduce clutter), lines 211 represent coupling devices (only one called out in the Figure to reduce clutter), and circles 221, 222 represent problem instances. Instance 221 represents a first instance of a problem programmed into a quantum processor, such as an instance of Equation 3 programmed into quantum processor 100 (with processor 100 being extended to include at least ten qubits and at least fifteen couplers). In accordance with the present systems and methods, the effects of decoherence and noise on the solution of problem instance 221 may be reduced by simultaneously programming a second instance 222 into a separate set of qubits and couplers in the quantum processor and coupling at least some of the qubits of the second instance 222 to the first instance 221. In this sense, second instance 222 is a copy or "replica" of first instance 221. When the quantum processor is evolved, both the first instance 221 and the second instance 222 of the same problem are "solved" simultaneously and coupled together to effectively shrink the influence of decoherence and noise. The coupling between replicas (e.g., the coupling between instances 221 and 222) provides a mechanism for correcting or stabilizing any errors or anomalies that may appear in any specific qubit 201 or instance 221, 222 by effectively smearing out the influence of noise. For example, if a form of noise has an influence of X on a qubit in instance 221, then that same form of noise may have an influence of about X/2 on the same qubit in instance 221 when that qubit is coupled to a replica qubit in instance 222. In accordance with the present systems and methods, the influence of decoherence/noise may be inversely proportional to the number of replica instances in the quantum processor such that the influence of decoherence/noise may decrease as the number of replica instances increases. Thus, while FIG. 2 depicts two instances 221, 222 of a problem, any number of instances (i.e., any number of replicas, such as 2 replicas, 5 replicas, 10 replicas, 20 replicas, 100 replicas, etc.) may be employed provided there are sufficient qubits in the quantum processor to encode each instance.

The coupling between replicas/instances (e.g., the coupling between qubits of instance 221 with qubits of instance 222) may be weaker than the coupling between qubits of the same instance (e.g., the coupling between qubits within instance 221). In some implementations, the coupling between qubits of instance 221 with qubits of replicas is a diagonal coupling. In some embodiments, replica qubits may be programmed slightly differently from one another (and/or some pairs of replica qubits may be coupled together slightly differently from other pairs of replica qubits) in order to realize specific error correction codes, such as for example, a majority voting scheme.

In accordance with the present systems and methods, replica coding schemes may be implemented in existing adiabatic quantum computing processors and/or quantum annealing processors provided a sufficient architecture of qubits and coupling devices exists to encode the problem instance and at least one (but potentially many more than one) replica instance. However, a quantum processor architecture may also be specifically adapted to facilitate replica coding.

A quantum processor architecture may be specifically adapted to implement replica coding by physically arranging replica qubits sets in the quantum processor architecture. For example, a first set of qubits and coupling devices may be arranged on a first layer of a quantum processor, a first set of replica qubits and replica coupling devices may be arranged on a second layer of the quantum processor with at least some qubits in the first set of replica qubits communicatively coupleable (e.g., weakly communicatively coupleable via coupling devices) to corresponding qubits in the first set of qubits, a second set of replica qubits and replica coupling devices may be arranged on a third layer of the quantum processor with at least some qubits in the second set of replica qubits communicatively coupleable (e.g., weakly communicatively coupleable via coupling devices) to corresponding qubits in either the first set of qubits, the first set of replica qubits, or both the first set of qubits and the first set of replica qubits, and so on, for any number of sets of replica qubits and replica coupling devices. In some embodiments, qubits from different replica sets may be included within the same physical layer of the quantum processor architecture.

Figure 3:
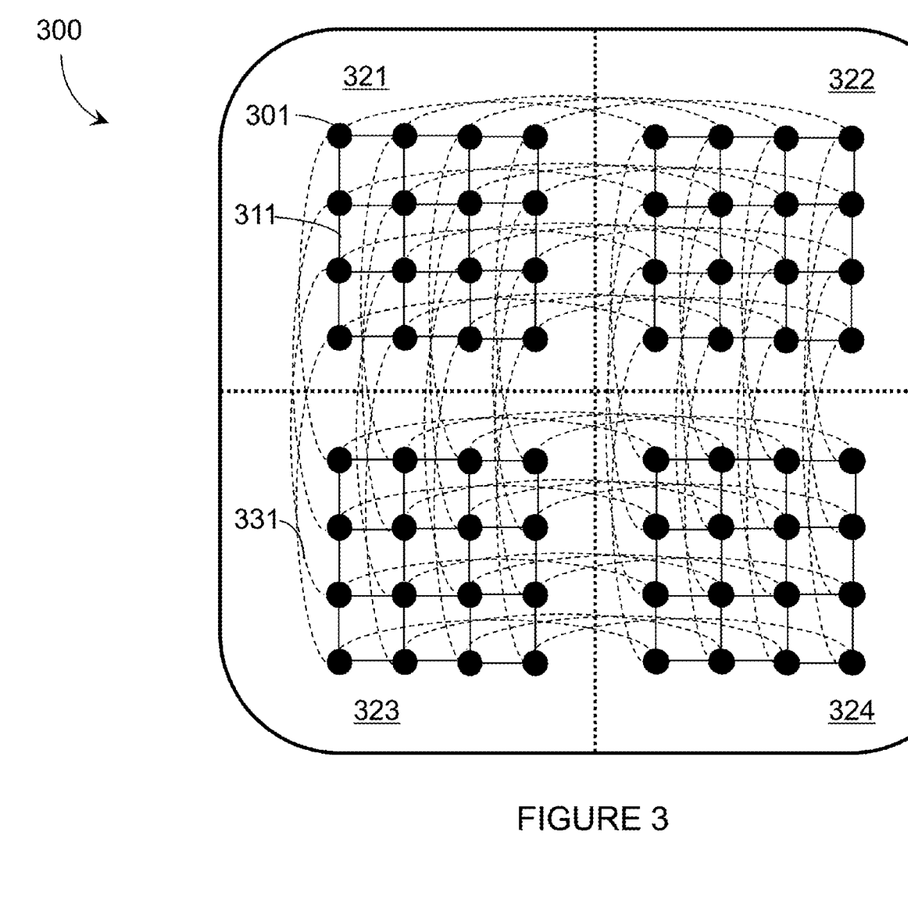
FIG. 3 is a schematic diagram of a portion of an exemplary quantum processor architecture adapted to facilitate replica coding in accordance with the present systems and methods.

FIG. 3 is a schematic diagram of a portion of an exemplary quantum processor architecture 300 adapted to facilitate replica coding in accordance with the present systems and methods. Quantum processor 300 includes qubits 301 (illustrated as solid black nodes, only one called out to reduce clutter) and coupling devices 311 (illustrated as solid black lines, only one called out to reduce clutter). Quantum processor 300 is illustratively divided into four quadrants, with each quadrant representing a specific set of qubits 301 and coupling devices 311 (i.e., a specific instance as described previously). For example, instance 321 includes sixteen qubits 301 and twenty-four couplers 311. Each qubit 301 in instance 321 is coupled to a first corresponding replica qubit in instance 322 and a second corresponding replica qubit in instance 323; each qubit in instance 322 is coupled to a first corresponding replica qubit in instance 321 and a second corresponding replica qubit in instance 324; each qubit in instance 323 is coupled to a first corresponding replica qubit in instance 321 and a second corresponding replica qubit in instance 324; and each qubit in instance 324 is coupled to a first corresponding replica qubit in instance 322 and a second corresponding replica qubit in instance 323. As will be understood form the above description, each of instances 321-324 are nominally identical to one another. Inter-instance couplings are provided by coupling devices 331, which are represented by dashed lines in FIG. 3 (only one called out to reduce clutter). Inter-instance coupling devices 331 may be substantially similar to intra-instance coupling devices 311; however, inter-instance coupling may not need to provide the same range of tenability or strength of coupling as intra-instance coupling and, accordingly, intra-instance coupling devices 331 may be simplified to provide weaker and less tunable coupling than intra-instance coupling devices 311.

Inter-instance coupling devices 331 may be simplified in comparison to intra-instance coupling devices 311. Similarly, some replicas/instances (e.g., at least one of instances 321, 322, 323, 324) may not include read out devices. In some algorithms, it may be necessary to read out from only one instance and not from any replicas. In other algorithms, it may be advantageous to read out form multiple instances, in which case read out devices may be required in multiple or all instances/replicas. Some instances may share read out devices and/or some instances may share at least some programming circuitry.

Figure 4:
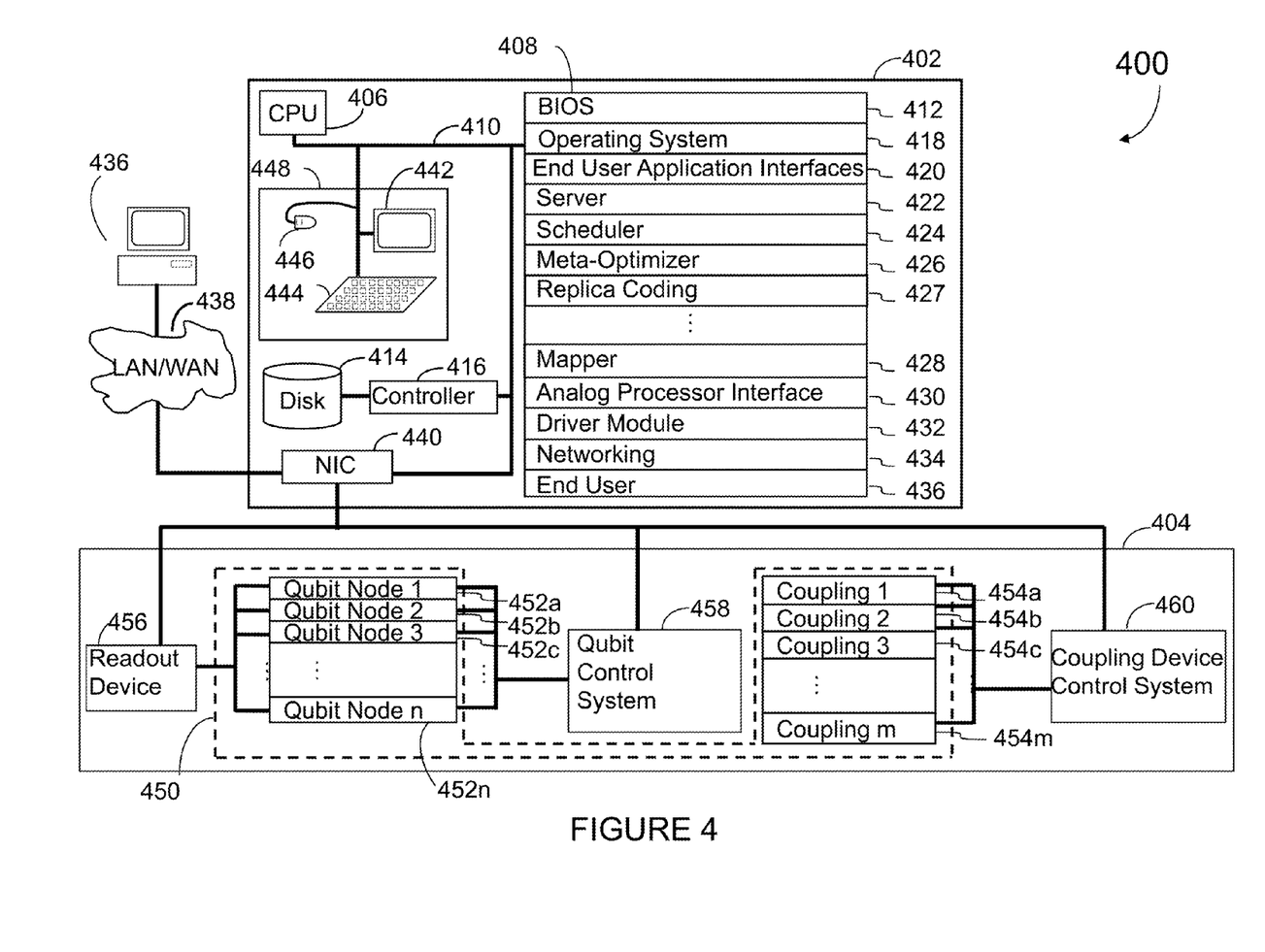
FIG. 4 is a functional block diagram showing a computing system employing at least one quantum processor in accordance with the present systems and methods.

FIG. 4 is a functional block diagram showing a computing system 400 employing at least one quantum processor in accordance with the present systems and methods.

FIG. 4 and the following discussion provide a brief and general description of a suitable computing environment in which various embodiments of an analog computer including a quantum processor. Although not required, embodiments will be described in the general context of computer-executable instructions, such as program application modules, objects or macros being executed by a computer. Those skilled in the relevant art will appreciate that the disclosed systems, methods and articles can be practiced with other computing system configurations, including hand-held devices, multiprocessor systems, microprocessor-based or programmable consumer electronics, personal computers ("PCs"), network PCs, mini-computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 4 shows a computing system 400 operable to solve problems, according to one illustrated embodiment.

The computing system 400 includes a digital computing subsystem 402 and an analog computing subsystem 404 communicatively coupled to the digital computing subsystem 402.

The digital computing subsystem 402 includes one or more processing units 406, system memory 408, and system bus 410 that couple various system components including the system memory 408 to the processing unit 406. The digital computing subsystem 402 will at times be referred to in the singular herein, but this is not intended to limit the application to a single digital computing subsystem 402 since in typical embodiments, there will be more than one digital computing subsystem 402 or other device involved. Other computing systems may be employed, such as conventional and personal computers, where the size or scale of the system allows. The processing unit 406 may be any logic processing unit, such as one or more central processing units ("CPUs"), digital signal processors ("DSPs"), application-specific integrated circuits ("ASICs"), etc, Unless described otherwise, the construction and operation of the various blocks shown in FIG. 4 are of conventional design. As a result, such blocks need not be described in further detail herein, as they will be understood by those skilled in the relevant art.

The system bus 410 can employ any known bus structures or architectures, including a memory bus with memory controller, a peripheral bus, and a local bus. The system memory 408 may include read-only memory ("ROM") and random access memory ("RAM"). A basic input/output system ("BIOS") 412, which can form part of the ROM, contains basic routines that help transfer information between elements within the digital computing subsystem 402, such as during startup.

The digital computing subsystem 402 also includes non-volatile memory 414. The non-volatile memory 414 may take a variety of forms, for example a hard disk drive for reading from and writing to a hard disk, and an optical disk drive and a magnetic disk drive for reading from and writing to removable optical disks and magnetic disks, respectively. The optical disk can be read by a CD-ROM, while the magnetic disk can be a magnetic floppy disk or diskette. The hard disk drive, optical disk drive and magnetic disk drive communicate with the processing unit 406 via the system bus 410. The hard disk drive, optical disk drive and magnetic disk drive may include appropriate interfaces or controllers 416 coupled between such drives and the system bus 410, as is known by those skilled in the relevant art. The drives, and their associated computer-readable media, provide non-volatile storage of computer readable instructions, data structures, program modules and other data for the digital computing subsystem 402. Although the depicted digital computing subsystem 402 has been described as employing hard disks, optical disks and/or magnetic disks, those skilled in the relevant art will appreciate that other types of non-volatile computer-readable media that can store data accessible by a computer may be employed, such a magnetic cassettes, flash memory cards, digital video disks ("DVD"), Bernoulli cartridges, RAMs, ROMs, smart cards, etc.

Various program modules or application programs and/or data can be stored in the system memory 408. For example, the system memory 408 may store an operating system 418, end user application interfaces 420, server applications 422, scheduler modules 424, and/or meta-optimizer modules 426. For example, the system memory 408 may store a replica coding module 427 for implementing methods of FIGS. 1-3. Also for example, the system memory 408 may additionally or alternatively store one or more mapper modules 428, analog processor interface modules 430, and/or driver modules 432. The operation and function of these modules are discussed in detail below.

The system memory 408 may also include one or more networking applications 434, for example a Web server application and/or Web client or browser application for permitting the digital computing subsystem 402 to exchange data with sources via the Internet, corporate Intranets, or other networks as described below, as well as with other server applications on server computers such as those further discussed below. The networking application 434 in the depicted embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available such those available from Mozilla and Microsoft.

While shown in FIG. 4 as being stored in the system memory 408, the operating system 418 and various applications 420, 422, 424, 426, 428, 430, 432, 434 and/or data can be stored on the hard disk of the hard disk drive, the optical disk of the optical disk drive and/or the magnetic disk of the magnetic disk drive.

The digital computing subsystem 402 can operate in a networked environment using logical connections to one or more end user computing systems 436 (only one shown), such as one or more remote computers or networks. The digital computing subsystem 402 may be logically connected to one or more end user computing systems 436 under any known method of permitting computers to communicate, for example through a network 438 such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, the digital computing subsystem 402 is connected to the LAN through an adapter or network interface card 440 (communicative linked to the system bus 410). When used in a WAN networking environment, the digital computing subsystem 402 may include an interface and modem (not shown) or other device, such as the network interface card 440, for establishing communications over the WAN/Internet.

In a networked environment, program modules, application programs, or data, or portions thereof, can be stored in the digital computing subsystem 402 for provision to the networked computers. In one embodiment, the digital computing subsystem 402 is communicatively linked through the network 438 with TCP/IP middle layer network protocols; however, other similar network protocol layers are used in other embodiments, such as user datagram protocol ("UDP"). Those skilled in the relevant art will readily recognize that the network connections shown in FIG. 4 are only some examples of establishing communications links between computers, and other links may be used, including wireless links.

While in most instances the digital computing subsystem 402 will operate automatically, where an end user application interface is provided, an operator can enter commands and information into the digital computing subsystem 402 through the end user application interface 448 including input devices, such as a keyboard 444, and a pointing device, such as a mouse 446. Other input devices can include a microphone, joystick, scanner, etc. These and other input devices are connected to the processing unit 406 through the end user application interface 420, such as a serial port interface that couples to the system bus 410, although other interfaces, such as a parallel port, a game port, or a wireless interface, or a universal serial bus ("USB") can be used. A monitor 442 or other display device is coupled to the bus 410 via a video interface, such as a video adapter (not shown). The digital computing subsystem 402 can include other output devices, such as speakers, printers, etc.

The analog computing subsystem 404 includes an analog processor, for example, a quantum processor 450. The quantum processor 450 includes multiple qubit nodes 452$a$, $b$, $c$, and so on to n (collectively 452) and multiple coupling devices 454$a$, $b$, $c$, and so on to m (collectively 454).

The analog computing subsystem 404 includes a readout device 456 for reading out one or more qubit nodes 452. For example, readout device 456 may include multiple dc-SQUID magnetometers, with each dc-SQUID magnetometer being inductively connected to a qubit node 452 and MC 440 receiving a voltage or current from readout device 456. The dc-SQUID magnetometers comprise a loop of superconducting material interrupted by two Josephson junctions and are well known in the art.

The analog computing subsystem 404 also includes a qubit control system 458 including controller(s) for controlling or setting one or more parameters of some or all of the qubit nodes 452. The analog computing subsystem 404 further includes a coupling device control system 460 including coupling controller(s) for coupling devices 454. For example, each coupling controller in coupling device control system 460 may be capable of tuning the coupling strength of a coupling device 454 between a minimum and a maximum value. Coupling devices 454 may be tunable to provide ferromagnetic or anti-ferromagnetic coupling between qubit nodes 452.

Where computing system 400 includes a driver module 432, the driver module 432 may include instructions to output signals to quantum processor 450. NIC 440 may include appropriate hardware required for interfacing with qubit nodes 452 and coupling devices 454, either directly or through readout device 456, gun control system 458, and/or coupling device control system 460. Alternatively, MC 440 may include software and/or hardware that translate commands from driver module 432 into signals (e.g., voltages, currents, optical signals, etc.) that are directly applied to qubit nodes 452 and coupling devices. In another alternative, NIC 440 may include software and/or hardware that translates signals (representing a solution to a problem or some other form of feedback) from qubit nodes 452 and coupling devices 454. In some cases, analog processor interface module 430 may communicate with driver module 432 rather than directly with NIC 440 in order to send and receive signals from quantum processor 450.

The functionality of NIC 440 can be divided into two classes of functionality: data acquisition and control. Different types of chips may be used to handle each of these discrete functional classes. Data acquisition is used to measure the physical properties of qubit nodes 452 after quantum processor 450 has completed a computation. Such data can be measured using any number of customized or commercially available data acquisition micro-controllers including, but not limited to, data acquisition cards manufactured by Elan Digital Systems (Fareham, UK) including the AD132, AD136, MF232, MF236, AD142, AD218 and CF241 cards. Alternatively, data acquisition and control may be handled by a single type of microprocessor, such as the Elan D403C or D480C. There may be multiple NICs 440 in order to provide sufficient control over qubit nodes 452 and coupling devices 454 and in order to measure the results of a computation conducted on quantum processor 450.

Coupling devices 454 may either couple qubits 452 together ferromagnetically or anti-ferromagnetically or not couple qubits 452 together. A ferromagnetic coupling between two qubits 452 drives the qubits 452 to have the same state, whereas an anti-ferromagnetic coupling drives the qubits 452 to have opposite states. Charge-based coupling devices 454 may also be used. More information on coupling devices 454 useful in the present systems, methods and articles can be found in U.S. patent application Ser. No. 11/247,857 (now U.S. Pat. No. 7,619,437).

The analog computing subsystem 404 may be a superconducting quantum computer, examples of which include qubit registers, readout devices and ancillary devices. Superconducting quantum computers normally are operated at milliKelvin temperatures and often are operated in a dilution refrigerator. An example of a dilution refrigerator is the Leiden Cryogenics B.V. MNK 126 series (Galgewater No. 21, 2311 VZ Leiden, The Netherlands). All or part of the components of the analog computing subsystem 404 may be housed in the dilution refrigerator. For example, qubit control system 458 and coupling device control system 460 may be housed outside the dilution refrigerator with the quantum processor 450 being housed inside the dilution refrigerator.

Superconducting qubits useful in the present systems, methods and articles include superconducting flux qubits and superconducting charge qubits, both described in Makhlin et al., 2001, *Reviews of Modern Physics* 73, pp. 357-400. Examples of flux qubits that can be used include rf-SQUIDs, which have a superconducting loop interrupted by a Josephson junction, and persistent current qubits, which have a superconducting loop interrupted by three Josephson junctions. See Mooij et al., 1999, *Science* 285, 1036; and Orlando et al., 1999, *Physical Review B* 60, 15398. Other examples of superconducting qubits can be found in Il'ichev et al., 2003, *Physical Review Letters* 91, 097906; Blatter et al., 2001, *Physical Review B* 63, 174511; and Friedman et al., 2000, *Nature* 406, 43. In addition, hybrid charge-phase qubits may also be used, and examples of hybrid qubits can be found in U.S. Pat. Nos. 6,838,694 and 7,335,909.

Superconducting coupling devices useful in the present systems, methods and articles include rf-SQUIDs and dc-SQUIDs, which couple qubits together by flux. As described previously, SQUIDs have a superconducting loop interrupted by one (an rf-SQUID) or two (a dc-SQUID) Josephson junctions. In some cases, the coupling devices used may be capable of both ferromagnetic and anti-ferromagnetic coupling.

The readout devices 456, may also be superconducting devices, such as a dc-SQUID, or instead, a tank circuit may be used for the readout devices 456. The readout devices 456 may read out the state of a qubit 452 in the flux regime, or alternatively, read out the state of the qubit in the charge regime. Charge-based readout devices and charged-based local bias devices may be used.

The various embodiments described herein provide both systems for facilitating replica coding in quantum processor architectures as well as methods of implementing replica coding in quantum processor architectures. An exemplary system is provided in FIG. 3. An exemplary method is illustrated in FIG. 2, where a problem instance in programmatically mapped to (e.g., encoded or embedded in) a first set of qubits, the same problem instance in programmatically mapped to (e.g., encoded or embedded in) a second set of qubits, and coupling is provided between at least some qubits in the first set of qubits and at least some qubits in the second set of qubits.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, International (PCT) patent applications referred to in this specification and/or listed in the Application Data Sheet including U.S. provisional Patent Application Ser. No. 61/761,100 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An analog computer for solving a computational problem, the analog computer comprising:
   a quantum processor comprising:
      a first set of qubits and a first set of coupling devices that provide communicative coupling between qubits in the first set of qubits, the first set of qubits and the first set of coupling devices representing a first instance of the computational problem programmed into the quantum processor;
      a first set of replica qubits and a first set of replica coupling devices that provide communicative coupling between the first set of replica qubits, the first set of replica qubits and the first set of replica coupling devices representing a second instance of the computational problem programmed into the quantum processor, wherein for each qubit in the first set of qubits a corresponding replica qubit exists in the first set of replica qubits, and for each coupling device in the first set of coupling devices a replica coupling device exists in the first set of replica coupling devices; and
      a second set of coupling devices, wherein each coupling device in the second set of coupling devices provides communicative coupling between a qubit in the first set of qubits and the corresponding replica qubit in the first set of replica qubits, the analog computer further comprising:
   one or more readout devices operable to read out the state of one or more of the first set of qubits and the first set of replica qubits;

a qubit control system communicatively coupled to control one or more of the first set of qubits and the first set of replica qubits; and a coupler control system communicatively coupled to control one or more of the first set of coupling devices, the first set of replica coupling devices, and the second set of coupling devices, wherein the analog computer is selectively operable to perform quantum annealing on the first and the second instances of the computational problem at the same time to reduce the effects of decoherence and noise.

2. The analog computer of claim 1 wherein the quantum processor is a superconducting quantum processor, the qubits in the first set of qubits and the first set of replica qubits are superconducting qubits, and the coupling devices in the first set of coupling devices, the first set of replica coupling devices, and the second set of coupling devices are superconducting coupling devices.

3. The analog computer of claim 2 wherein the qubits are superconducting flux qubits.

4. The analog computer of claim 1 wherein at least some of the coupling devices of each of the first set of coupling devices, the first set of replica coupling devices, and the second set of coupling devices are operable to provide a respective diagonal coupling.

5. The analog computer of claim 1, wherein the quantum processor further comprises:

a first interface that in use provides off-diagonal single qubit terms of the Hamiltonians of the first set of qubits and the first set of replica qubits;

a second interface that in use provides diagonal single qubit terms of the Hamiltonians of the first set of qubits and the first set of replica qubits; and a third interface that in use provides diagonal two qubit terms of the Hamiltonians of the first set of qubits and the first set of replica qubits, wherein the diagonal two qubit terms are associated with the first set of coupling devices and the first set of replica coupling devices.

6. The analog computer of claim 1 wherein the quantum processor further comprises:

a second set of replica qubits and a second set of replica coupling devices that provide communicative coupling between the second set of replica qubits, the second set of replica qubits and the second set of replica coupling devices representing a third instance of the computational problem programmed into the quantum processor, wherein for each qubit in the first set of qubits a corresponding replica qubit exists in the second set of replica qubits, and for each coupling device in the first set of coupling devices a replica coupling device exists in the second set of replica coupling devices; and a third set of coupling devices, wherein each coupling device in the third set of coupling devices provides communicative coupling between a qubit in the first set of qubits and the corresponding replica qubit in the second set of replica qubits;

one or more readout devices operable to read out the state of one or more of the second set of replica qubits;

a qubit control system communicatively coupled to control one or more of the second set of replica qubits; and a coupler control system communicatively coupled to control one or more of the second set of replica coupling devices, and the third set of coupling devices, wherein the analog computer is selectively operable to perform quantum annealing on the first, the second and the third instances of the computational problem at the same time to reduce the effects of decoherence and noise.

7. The analog computer of claim 1 wherein the first instance of the computational problem programmed into the quantum processor is different than the second instance of the computational problem programmed into the quantum processor, and the analog computer is selectively operable to realize a selected error correction code.

8. The analog computer of claim 7 wherein the selected error correction code is a majority voting scheme.

9. The analog computer of claim 1 wherein the strength of coupling of one or more of the second set of coupling devices is less than the strength of coupling of one or more of the first set of coupling devices and one or more of the first set of replica coupling devices.

10. The analog computer of claim 1 wherein the quantum processor further comprises:

a first physical layer, the first set of qubits and the first set of coupling devices arranged on the first physical layer; and a second physical layer, the first set of replica qubits and the first set of replica coupling devices arranged on the second physical layer.

11. The analog computer of claim 1 wherein the readout devices are selectively operable to read out the state of one or more qubits in one of either the first set of qubits or the first set of replica qubits.

12. The analog computer of claim 1 wherein a readout device is selectively operable to read out the state of a respective qubit from both the first set of qubits and from the first set of replica qubits.

* * * * *